United States Patent [19]

Sakakibara

[11] 4,210,908
[45] Jul. 1, 1980

[54] TWO-DIMENSIONAL DISPLAY APPARATUS FOR AN AUTOMOBILE

[75] Inventor: Yasuyuki Sakakibara, Okazaki, Japan

[73] Assignee: Nippon Soken, Inc., Nishio, Japan

[21] Appl. No.: 879,496

[22] Filed: Feb. 21, 1978

[30] Foreign Application Priority Data

Feb. 23, 1977 [JP] Japan .................. 52-21707

[51] Int. Cl.² .................................................. G06F 3/14
[52] U.S. Cl. .................................. 340/754; 340/706;
340/715; 340/782; 340/52 R
[58] Field of Search ................ 340/324 M, 52 R, 706,
340/701, 715, 753, 754, 782, 811

[56] References Cited

U.S. PATENT DOCUMENTS

| | | | |
|---|---|---|---|
| 2,817,815 | 12/1957 | Evans | 340/324 R |
| 3,021,387 | 2/1962 | Rajchman | 340/324 R |
| 3,258,743 | 6/1966 | Schuster | 340/701 |
| 3,296,608 | 1/1967 | Feitler | 340/324 R |
| 3,908,152 | 9/1975 | Pfister | 340/324 M |

Primary Examiner—Marshall M. Curtis
Attorney, Agent, or Firm—Cushman, Darby & Cushman

[57] ABSTRACT

A display apparatus for displaying two-dimensionally on a plane the correlation between two parameters, such as the acceleration of an automobile and the fuel consumption rate in its engine, which vary in association with the running of the automobile. The displaying portion includes a plurality of light-emitting elements which are arranged in rows and columns on the same plane so as to be given their respective co-ordinates, or ordinates and abscissas. The acceleration of an automobile is calculated corresponding to the counted value of speed pulses having a frequency proportional to the speed of revolution of the wheels so that the calculated acceleration value may be discriminated to show to which of a plurality of acceleration ranges the acceleration value belongs. Similarly, the fuel consumption rate in the engine is calculated corresponding to the counted value of fuel pulses having a frequency proportional to the fuel consumption rate so that the calculated fuel consumption rate value may be discriminated to show to which of a plurality of fuel consumption rate ranges the fuel consumption rate belongs. The results of discrimination with respect to acceleration and fuel consumption rate are assigned to the ordinate and abscissa on the plane, respectively, so that one of the light-emitting elements arranged at the thus assigned co-ordinates may be lighted. The position or co-ordinate of the lighted element indicates the correlation between the acceleration and the fuel consumption rate.

6 Claims, 6 Drawing Figures

TWO-DIMENSIONAL DISPLAY APPARATUS FOR AN AUTOMOBILE

BACKGROUND OF THE INVENTION

The present invention relates to a two-dimensional display apparatus for displaying as a point or an area on a plane different parameters such as the acceleration and the fuel consumption rate of an automobile.

Heretofore, an apparatus has been known which calculates and displays parameters, such as the number of rotation of an automobile's engine, the fuel consumption rate and the acceleration of an automobile, which parameters vary in association with the running of an automobile. Further, it has been known to display these parameters in an analogue or digital manner. However, in such known apparatus, for example, in an analogue display apparatus, it is made generally that, when different parameters are to be displayed on a plane, the parameters are displayed in the same direction on the plane, such as longitudinal or transverse direction. Therefore, it is very difficult for a driver of an automobile to be readily acquainted with the correlation between the different parameters which vary in association with each other.

BRIEF SUMMARY OF THE INVENTION

An object of the present invention is to provide a two-dimensional display apparatus for an automobile which displays as a point or an area on a plane two different parameters which vary in association with each other in conjunction with the running of the automobile.

Another object of the present invention is to provide a two-dimensional display apparatus for an automobile which displays as a point or an area on a plane the acceleration of the automobile and the fuel consumption rate of the engine of the automobile both varying in association with each other.

The above-described objects of the present invention can be attained as follows two different parameters varying in association with each other are divided into a plurality of ranges respectively along the ordinate and the abscissa on a plane so that appropriate ranges along the ordinate and the obscissa may be selected respectively corresponding to the calculated values of these parameters, and the single portion selected in common by the respective ranges of the ordinate and the abscissa may be lighted.

DESCRIPTION OF PREFERRED EMBODIMENT

In the following, a two-dimensional display apparatus for an automobile according to the present invention will be described with respect to an embodiment shown in the accompanying drawings.

Figure 1:
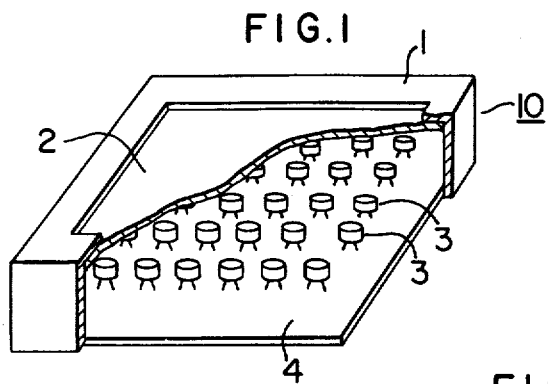
FIG. 1 is a diagrammatic view showing the display portion, partly broken away, of a two-dimensional display apparatus for an atuomobile according to the present invention.
Figure 2:
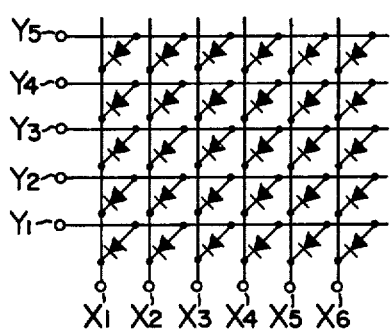
FIG. 2 is a view showing the arrangement of a plurality of light-emitting elements and the electrical connection in the display portion.
Figure 3:
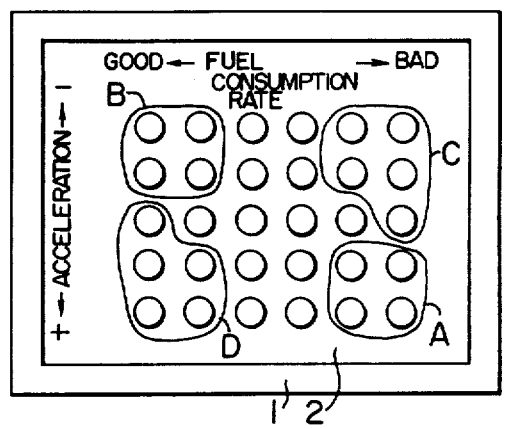
FIG. 3 is a view showing the panel of the display portion of FIG. 1, in which the acceleration and the fuel consumption rate are displayed.

In FIG. 1, reference numeral 10 is a display portion which displays, at the location where a driver of the automobile can recognize, two different parameters varying in association with each other and which includes a housing 1, an optical filter 2 fixed to the housing 1, a plurality of light-emitting diodes 3 arranged in rows and columns for giving luminance to a corresponding portion of the optical filter 2, and a printed board 4 for holding the plurality of light-emitting diodes 3 and for connecting electrically the light-emitting diodes 3 with each other. The plurality of light-emitting diodes 3 are arranged in the space defined by the optical filter 2 and the printed board 4 and include thirty diodes, as shown in FIG. 2, arranged in five rows and six columns. Each of the anodes of the light-emitting diodes 3 is electrically connected with one of the terminals $Y_1$ to $Y_5$ respectively defining the five rows, while each of the cathodes of the light-emitting diodes 3 is electrically connected with one of the terminals $X_1$ to $X_6$ respectively defining the six columns. In the electrical connection shown in FIG. 2, when, for example, the terminals $X_2$ and $Y_3$ are supplied with a low level voltage ("0" signal) and a high level voltage ("1" signal), respectively, only the light-emitting diode whose anode and cathode are connected with the terminals $Y_3$ and $X_2$, respectively, is supplied with current so as to be lighted. Thus, the respective light-emitting diodes 3 have their own coordinates $(X_m, Y_n)$, where, $m=1$ to 6 and $n=1$ to 5, which correspond to the abscissas defined by the terminals $X_m$ ($m=1$ to 6) and the ordinates defined by the terminals $Y_n$ ($n=1$ to 5), and, when the terminals $X_m$ and $Y_n$ are supplied with the "0 signal" and "1 signal", respectively, only the light-emitting diode corresponding to the coordinates $(X_m, Y_n)$ is lighted. The areas of the optical filter 2 which are given luminance by the respective light-emitting diodes 3 being lighted are shown as thirty dots in FIG. 3. In FIG. 3, the optical filter 2 is provided with indications of "ACCELERATION" along the ordinate and of "FUEL CONSUMPTION RATE" along the abscissa. As described above, since only one of the plurality of light-emitting diodes 3 are supplied with current at a selected instant in time and thus only one area of the optical filter 2 which corresponds to the lighting diode is given luminance, both the acceleration and the fuel consumption rate are displayed on the optical filter 2 as an area or dot provided with luminance. Further, since the acceleration is displayed in five stages and the fuel consumption rate in six stages; when, in FIG. 3, a luminant spot appears within a portion A, it is meant that the acceleration is positive while the fuel consumption rate is bad; on the other hand, when a luminant spot appears within a portion B, negative acceleration (decelerated state) and good fuel consumption rate are meant. Further, a portion C indicates indirectly that the automobile is in the state of ascending a slope and a portion D indicates indirectly that the automobile is in the state of descending a slope. Thus, the driver of the automobile can readily recognize the operating condition of the automobile only by the rough location of the luminant spot on the optical filter 2.

Next, an electrical circuit for calculating and discriminating the acceleration and fuel consumption rate whose correlation is to be displayed on the display portion 10 will be described.

Figure 4:
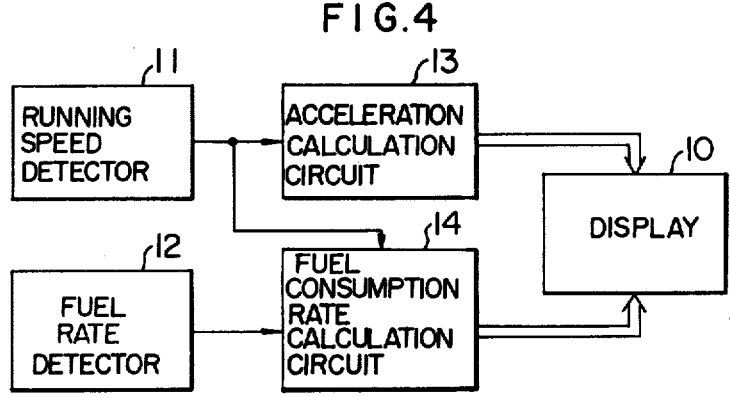
FIG. 4 is a block diagram showing the constitution of an entire circuit for calcualting the acceleration and the fuel consumption rate.

In FIG. 4, reference numeral 11 denotes a running speed detecting circuit for generating speed pulses having a frequency proportional to the running speed of the automobile, reference numeral 12 denotes a fuel rate detecting circuit for generating fuel pulses having a frequency proportional to the fuel consumption speed in the automobile's engine, reference numeral 13 denotes an acceleration calculation circuit for calculating the acceleration of the automobile in response to the speed pulses, and reference numeral 14 denotes a fuel consumption rate calculation circuit for calculating the fuel consumption rate (the running distance of the automobile per unit fuel consumption) in response to the speed pulses and the fuel pulses. The acceleration calculation circuit 13 and the fuel consumption rate calculation circuit 14 generate, respectively, a parallel digital signal having the same bits as the number of the row terminals ($Y_1$ to $Y_5$) and a parallel digital signal having the same bits as the number of the column terminals ($X_1$ to $X_6$), these terminals being connected with the light-emitting diodes 3 in the display portion 10.

The running speed detecting circuit 11 and the fuel speed detecting circuit 12 shown in FIG. 4 are known circuits. For example, the running speed detecting circuit 11 may be constructed so that a pulse is generated every time the automobile's wheel rotates a predetermined rotational angle, and the fuel rate detector 12 may be constructed such that a pulse is generated every time the amount of air inhaled into the engine or the amount of fuel supplied to the engine reaches a predetermined value. Therefore, only the acceleration calculation circuit 13 and the fuel consumption rate calculation circuit 14 will be described in detail.

Figure 5:
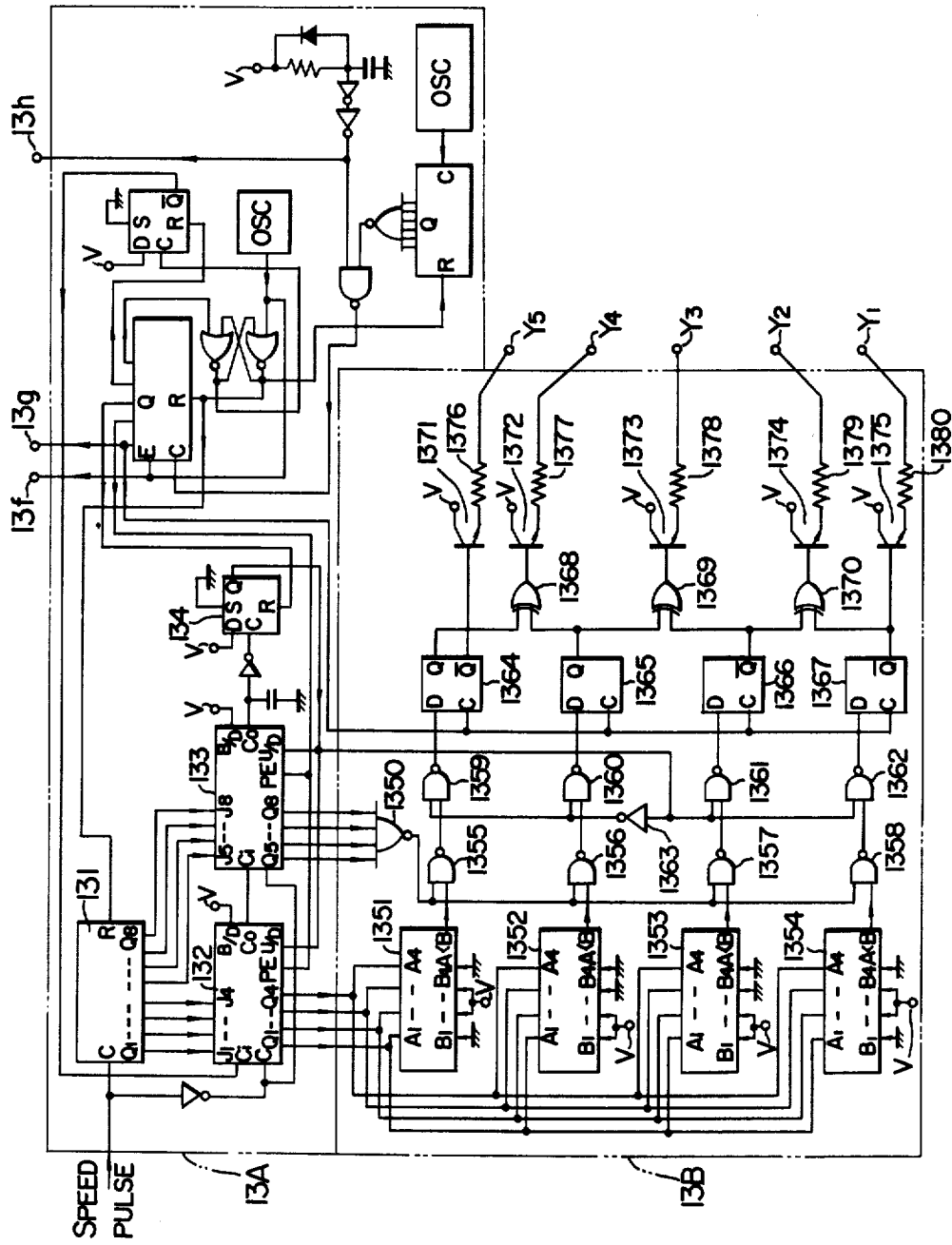
FIG. 5 is an electrical circuit diagram showing the detailed constitution of the acceleration calculating circuit of FIG. 4.

As shown in FIG. 5, the acceleration calculation circuit 13 includes a speed difference calculation circuit 13A and an acceleration discrimination circuit 13B.

The speed difference calculation circuit 13A is of the known constitution as disclosed in the Japanese Patent Laid-Open Application No. 28372/77 which corresponds to the Kuno et al Pat. No. 4,070,562. Thus, only the elements which are essential for explaining the calculation of the speed difference are numbered while the elements which are not essential for explanation are not numbered. Reference numeral 131 denotes a binary counter which counts repeatedly during a predetermined time period T speed pulses fed from the running speed detecting circuit 11 and having a frequency proportional to the running speed of the automobile, numerals 132 and 133 denote each an up-down counter in 55 which a value counted during the i-th counting period T of the binary counter 131 is read immediately after the period T, and during the following (i+1)-th period T the operation of reduction or addition is made in response to the speed pulses. Each of the up-down counters 132 and 133 down-counts or up-counts during the time when an up-down terminal (U/D) is supplied with a "0" signal or a "1" signal, respectively, and generates a "0" signal at carry-out terminals (CO) when down-counting ends. Numeral 134 is a D-flip-flop which generates a "1" signal at an output terminal (Q) when a clock terminal (C) is supplied with a "1" signal. The elements which are not numbered are connected with each other so that the counting period T of the binary counter 131 is determined and the reset timing of the binary counter 131, the preset (P/E) timing of the up-down counters 132, 133 and the reset timing of the D-flip-flop 134 are controlled. Since the binary counter 131 is reset every time period T, the binary-code signal which is supplied from the output ($Q8_8$ - - - $Q_1$) to the input ($J_8$ - - - $J_1$) of the up-down counters 132 and 133 has a value N proportional to the running speed, or the running distance, of the automobile. Now, assuming that the number of speed pulses generated during the i-th period T and the following (i+1)-th period T are $N_i$ and $N_{i+1}$, respectively, the output ($Q_8$ - - -, $Q_1$) of the up-down counters 132, 133 provides immediately after the (i+1)-th period T the absolute value of the speed difference $|N_i - N_{i+1}|$ in binary code. It is to be noted that, since the acceleration of the automobile is proportional to the speed difference, the output value ($Q_8$ - - - $Q_1$) of the up-down counters indicates the acceleration value of the automobile. Further, an indication that whether the speed difference ($N_i - N_{i+1}$) is positive or negative is made respectively by the "0" or "1" signals provided at the output Q of the D-flip-flop 134. Needless to say, the "0" and "1" signals provided by the D-flip-flop 134 mean the deceleration and acceleration of the automobile, respectively. In this embodiment, 2548 speed pulses are arranged to be supplied while the automobile runs 1000 meters, and the timer period T is set to be 2.8 seconds. Thus, the binary-coded output ($Q_8$ - - - $Q_1$) of the up-down counters 132 and 133 is changed every time the acceleration value is changed by 0.005 G (where, G is the gravitational acceleration). For example, when the acceleration is +0.02 G, the up-down counters 132 and 133 has a binary coded output of 00000100.

The acceleration discrimination circuit 13B includes a NOR gate 1350, digital comparators 1351, 1352, 1353 and 1354, NAND gates 1355, 1356, 1357, 1358, 1359, 1360, and 1361 and 1362, an inverter 1363, D-flip-flops 1364, 1365, 1366 and 1367, EXCLUSIVE-OR gates 1368, 1369 and 1370, transistors 1371, 1372, 1373, 1374 and 1375 and resistors 1376, 1377, 1378, 1379 and 1380. Each of the inputs ($A_4$ - - - $A_1$) of the comparators 1351, 1352, 1353 and 1354 is supplied with the binary-coded output of the up-down counter 132 while each of the inputs ($B_4$ - - - $B_1$) of the comparators 1351, 1352, 1353 and 1354 are supplied with set binary codes 0110, 0011, 0011 and 0110, respectively. The binary codes 0110 and 0011 indicate set acceleration values of 0.03 G and 0.015 G, respectively. Each digital comparator generates a "1" signal at its output (A<B) only when the input binary code A is less than the set binary code. The NOR gate 1350 generates a "1" signal only when all the bits of the output binary code of the up-down counter 133 are at the "0" level. Since the output binary code of the up-down counter 133 corresponds to an acceleration value which is equal to and larger than 0.08 G, the NOR gate 1350 generates a "1" signal only when the acceleration is smaller than 0.08 G. The output signal of the NOR gate 1350 is supplied to the NAND gates 1355, 1356, 1357 and 1358 and the output signals of the comparators 1351, 1352, 1353 and 1354 are supplied to the NAND gates 1355, 1356, 1357 and 1358 respectively. The output signals of the NAND gates 1355, 1356, 1357 and 1358 are respectively supplied to the NAND gates 1359, 1360, 1361 and 1362 at the next stage. The output signal produced by the D-flip-flop 134 of the speed difference calculation circuit 13A is directly supplied to the NAND gates 1361 and 1362 and, on the other hand, is supplied through the inverter 1363 to the NAND gates 1359 and 1360. The D-flip-flops 1364, 1365, 1366 and 1367 memorize the outputs of the NAND gates 1359, 1360, 1361 and 1362, respectively, when respective clock terminals (C) are supplied with pulses from the speed difference calculation circuit 13A immediately after the lapse of the predetermined period T. The Q output signal and the $\bar{Q}$ output signal of the flip-flop 1364 are respectively supplied to the EXCLUSIVE-OR gate 1368 and the transistor 1371. The Q output signal of the flip-flop 1365 is supplied to the EXCLUSIVE-OR gates 1368 and 1369, while the $\bar{Q}$ output signal of the flip-flop 1366 is supplied to the EXCLUSIVE-OR gates 1369 and 1370. The $\bar{Q}$ output signal of the flip-flop 1367 is supplied to the EXCLUSIVE-OR gate 1370 and the transistor 1375. The EXCLUSIVE-OR gates 1368, 1369 and 1370 respectively generate "0" signals only when their input signal levels are the same and their respective output signals are supplied to the transistors 1372, 1373 and 1374. Each of the transistors 1371, 1372, 1373, 1374 and 1375 is made conductive only when the input signal applied to its base is at the "1" level and supplies a "1" signal to the corresponding one of the terminals $Y_1$, $Y_2$, $Y_3$, $Y_4$ and $Y_5$.

By the above-described construction and operation, the acceleration is calculated in response to the speed difference of the automobile, then to which of a plurality of acceleration ranges the calculated value of acceleration belongs is discriminated, and only one of the terminals $Y_1$, $Y_2$, $Y_3$, $Y_4$ and $Y_5$ is selected depending on the result of the discrimination. The correspondence between the calculated acceleration value $\alpha$ of the automobile and the signal levels given to the terminals $Y_1$, $Y_2$, $Y_3$, $Y_4$ and $Y_5$ is summarized as shown in TABLE I.

TABLE I

| $\alpha$ | | | $Y_1$ | $Y_2$ | $Y_3$ | $Y_4$ | $Y_5$ |
|---|---|---|---|---|---|---|---|
| | $\alpha <$ | $-0.03\ G$ | 0 | 0 | 0 | 0 | 1 |
| $-0.03\ G$ | $\leq \alpha <$ | $-0.015\ G$ | 0 | 0 | 0 | 1 | 0 |
| $-0.015\ G$ | $\leq \alpha <$ | $+0.015\ G$ | 0 | 0 | 1 | 0 | 0 |
| $+0.015\ G$ | $\leq \alpha <$ | $+0.03\ G$ | 0 | 1 | 0 | 0 | 0 |
| $0.03\ G$ | $< \alpha$ | | 1 | 0 | 0 | 0 | 0 |

Figure 6:
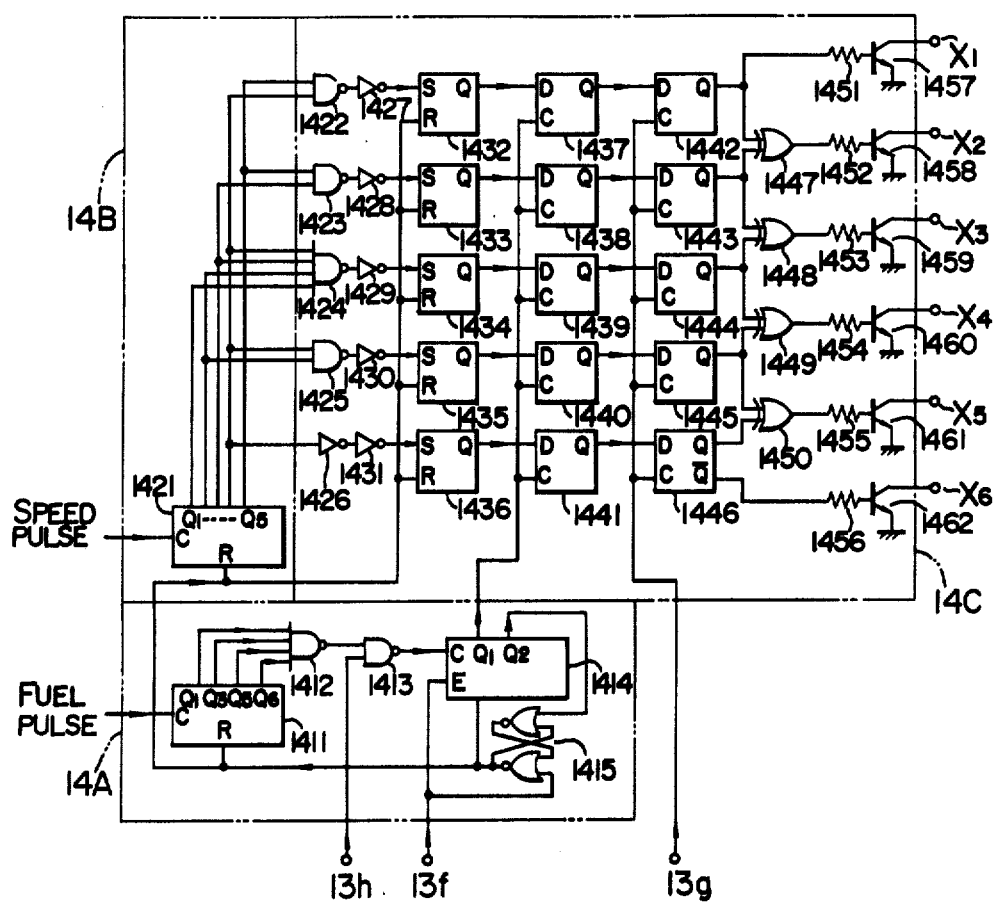
FIG. 6 is an electrical circuit diagram showing the detailed constitution of the fuel consumption rate calculating circuit of FIG. 4.

As shown in FIG. 6, the fuel consumption rate calculation circuit 14 includes a fuel measuring circuit 14A, a distance measuring circuit 14B, and a fuel consumption rate discrimination circuit 14C.

The fuel measuring circuit 14A includes a binary counter 1411 for counting fuel pulses, NAND gates 1412 and 1413, a decimal divider-counter 1414, and an R-S flip-flop 1415. In this embodiment, 1334 fuel pulses are adapted to be supplied to the binary counter 1411 while ten cubic centimeters of fuel is being consumed so that the NAND gate 1412 generates a "0" signal every time the binary counter 1411 counts 53 fuel pulses. The NAND gate 1413 is always supplied with "1" signals through a terminal 13h as long as the electrical circuit is supplied with power while the decimal divider-counter 1414 is supplied with clock signals of a constant frequency through a terminal 13f. When the NAND gate 1412 generates a "0" signal, the NAND gate 1413 generates a "1" signal. The decimal divider-counter 1414 responds to the "1" signal from the NAND gate 1413 for counting the clock signals so that the decimal divider-counter 1414 generates "1" signals at the outputs $Q_1$ and $Q_2$ when the counting value is one and two, respectively. The R-S flip-flop 1415 is reset by the "1" signal from the output $Q_2$ so as to generate a "1" output signal for resetting the binary counter 1411 and the decimal divider-counter 1414.

The distance measuring circuit 14B includes a binary counter 1421 which is reset by the "1" output signal from the R-S flip-flop 1415 in the fuel measuring circuit 14A. The binary counter 1421, after being reset, counts the speed pulses so that the counts are generated at its output ($Q_5$ - - - $Q_1$) in binary code. Since, as described above, the binary counter 1421 is reset every time 53 fuel pulses are generated and, on the other hand, since 2548 speed pulses are generated while the automobile runs for 1000 meters, the binary-coded output of the binary counter 1421 is changed every time the fuel consumption rate is changed by 1(m/cc). Thus, the "1" signals appearing on the outputs $Q_1$, $Q_2$, $Q_3$, $Q_4$ and $Q_5$ of the binary counter 1421 indicate the fuel consumption rates of 1(m/cc), 2(m/cc), 4(m/cc), 8(m/cc) and 16(m/cc), respectively.

The fuel consumption rate discrimination circuit 14C includes NAND gates 1422, 1423, 1424 and 1425, inverters 1426, 1427, 1428, 1429, 1430 and 1431, R-S flip-flops 1432, 1433, 1434, 1435, and 1436, D-flip-flops 1437, 1438, 1439, 1440, 1441, 1442, 1443, 1444, 1445 and 1446, EXCLUSIVE-OR gates 1447, 1448, 1449 and 1450, resistors 1451, 1452, 1453, 1454, 1455 and 1456, and transistors 1457, 1458, 1459, 1460, 1461 and 1462. The NAND gates 1422, 1423, 1424 and 1425 and the inverter 1426 generate "0" signals when the fuel consumption rate values outputted from the distance measuring circuit 14B are 24(m/cc), 20(m/cc), 15(m/cc), 10(m/cc), 8(m/cc), respectively. These "0" signals are supplied to the inverters 1427, 1428, 1429, 1430 and 1431 so as to be inverted into "1" signals for setting the R-S flip-flops 1432, 1433, 1434, 1435 and 1436, respectively. Then, the flip-flops 1432, 1433, 1434, 1435 and 1436 are reset simultaneously with the binary counters 1421. The R-S flip-flops 1432, 1433, 1434, 1435 and 1436 generate "1" signals at their Q outputs, respectively, only when they are set after being reset. The D flip-flops 1437, 1438, 1439, 1440 and 1441 of the next stage memorize the Q output signals of the preceding R-S flip-flops 1432, 1433, 1434, 1435 and 1436 immediately before the reset of the binary counter 1421. The signals stored in the D flip-flops 1437, 1438, 1439, 1440 and 1441 are further memorized in the D flip-flops 1442, 1443, 1444, 1445 and 1445 of the next stage, respectively. The D flip-flops 1442, 1443, 1444, 1445 and 1446 are timed to memorized when a terminal 13g is applied with a pulse, that is, the memory timing of the D flip-flops 1442, 1443, 1444, 1445 and 1446 becomes the same as that of the D flip-flops 1364, 1365, 1366 and 1367 in the acceleration discrimination circuit 13B shown in FIG. 5. The Q output signal of the flip-flop 1442 is supplied through the resistor 1451 to the transistor 1457 and the EXCLUSIVE-OR gate 1447. The Q output signal of the flip-flop 1443 is supplied to the EXCLUSIVE-OR gates 1447 and 1448, the Q output signal of the flip-flop 1444 is supplied to the EXCLUSIVE-OR gates 1448 and 1449, and the Q output signal of the flip-flop 1445 is supplied to the EXCLUSIVE-OR gates 1449 and 1450. The Q output signal of the flip-flop 1446 is supplied to the EXCLUSIVE-OR gate 1450 while the $\bar{Q}$ output signal of it is supplied through the resistor 1456 to the transistor 1462. The output signals of the EXCLUSIVE-OR gates 1447, 1448, 1449 and 1450 are supplied through the resistors 1452, 1453, 1454 and 1455 to the transistors 1458, 1459, 1460 and 1461. Each of the transistors 1457, 1458, 1459, 1460, 1461 and 1462 is made conductive only when its base is supplied with a "1" signal and only the corresponding one of the terminals $X_1$, $X_2$, $X_3$, $X_4$, $X_5$ and $X_6$ generates a "0" signal.

By the above-described construction and operation, the fuel consumption rate of the automobile engine is calculated, the calculated result is discriminated to which of a plurality of fuel consumption rate ranges the calculated result belongs, and only one of the terminals $X_1$, $X_2$, $X_3$, $X_4$, $X_5$ and $X_6$ is selected in response to the result of the discrimination. The correspondence between the calculated values $\beta$ of the fuel consumption rate and the signal levels given to the terminals $X_1$, $X_2$, $X_3$, $X_4$, $X_5$ and $X_6$ is summarized as shown in TABLE II.

TABLE II

| $\beta$ | $X_1$ | $X_2$ | $X_3$ | $X_4$ | $X_5$ | $X_6$ |
|---|---|---|---|---|---|---|
| $\beta < 8$ | 1 | 1 | 1 | 1 | 1 | 0 |
| $8 \leq \beta < 10$ | 1 | 1 | 1 | 1 | 0 | 1 |
| $10 \leq \beta < 15$ | 1 | 1 | 1 | 0 | 1 | 1 |
| $15 \leq \beta < 20$ | 1 | 1 | 0 | 1 | 1 | 1 |
| $20 \leq \beta < 24$ | 1 | 0 | 1 | 1 | 1 | 1 |
| $24 \leq \beta$ | 0 | 1 | 1 | 1 | 1 | 1 |

Although the above-described embodiment is concerned with the case in which the correlation between the acceleration of an automobile and its fuel consumption rate is displayed on a plane, these two parameters are not limited to the acceleration and the fuel consumption rate. So long as two different parameters which vary in association with each other as the automobile runs can be calculated, it is needless to say that these parameters can be displayed two-dimensionally on a plane.

What is claimed is:

1. A two-dimensional display apparatus for a vehicle for displaying two-dimensionally on a plane the correlation between two parameters which vary in association with the running of the automobile, comprising:

a display including a plurality of discrete, direct current light-emitting elements having opposite polarity terminals and being arranged as a matrix in rows and columns on a plane, each of said light-emitting elements being adapted to be lighted by being fed with a direct current and having a polarity of current flow, and a plurality of first electrical conductors and a plurality of second electrical conductors connected to the terminals of said light-emitting elements so that the terminals of one polarity of the elements for each row are connected by a respective first conductor and the terminals of the other polarity of the elements for each column are connected by a respective second conductor, a first signal generating circuit for generating first signals related to said first parameter of said vehicle and having a plurality of output terminals for coupling said first signals respectively with said first conductors corresponding to the rows of said light-emitting elements in said display for selectively energizing a particular row responsive to the value of said first parameter, and a second signal generating circuit for generating second signals related to said second parameter of said vehicle and having a plurality of output terminals for coupling said second signals respectively with said second conductors corresponding to the columns of the light-emitting elements in said display for selectively energizing a particular column responsive to the value of said second parameter; whereby light can only result from the single light-emitting element which is at the crossing point of the row and column respectively energized by said first and second signals from said first and second signal generating circuits for indicating a particular correlation between said parameters.

2. A two-dimensional display apparatus as defined in claim 1, wherein said light-emitting elements are light-emitting diodes.

3. A two-dimensional display apparatus as defined in claim 1, wherein said first parameter is the acceleration of the automobile and said second parameter is the fuel consumption as a function of distance traveled by said vehicle.

4. Apparatus as in claims 1, 2 or 3 wherein said second signal generating circuit comprises:

a fuel measuring circuit for developing an output fuel measurement signal, and a distance measuring circuit coupled to the output fuel measuring signal for determining fuel consumption as a function of distance traveled by the vehicle and for generating said second signals related thereto.

5. Apparatus as in claim 4 wherein said first signal generating circuit comprises:

a speed difference calculation circuit for developing a speed difference signal at its output related to the change in speed of the vehicle over a predetermined time interval, and an acceleration discrimination circuit coupled to the output of the speed difference calculation circuit for determining, within specific ranges of acceleration, the acceleration of the vehicle over a second predetermined time interval and for developing said first signals related to said specific ranges of acceleration.

6. Apparatus as in claim 5 wherein said first and second signals are generated by said generating circuits as digital signals.

* * * * *